United States Patent
Lee et al.

(10) Patent No.: US 11,772,310 B2
(45) Date of Patent: Oct. 3, 2023

(54) FRAME WITH AN OUTER SILICONE LAYER AND A MANUFACTURING METHOD OF FORMING THE SILICONE LAYER ON THE OUTER PART OF FRAME

(71) Applicant: CONCRAFT HOLDING CO., LTD., Grand Cayman (KY)

(72) Inventors: Kuo-Chi Lee, New Taipei (TW); Chin-Hsing Lee, New Taipei (TW); Lei Cheng, Kunshan (CN)

(73) Assignee: DRAGONSTATE TECHNOLOGY CO., LTD., New Taipei (TW)

( * ) Notice: Subject to any disclaimer, the term of this patent is extended or adjusted under 35 U.S.C. 154(b) by 435 days.

(21) Appl. No.: 16/842,182

(22) Filed: Apr. 7, 2020

(65) Prior Publication Data
US 2021/0245411 A1    Aug. 12, 2021

(30) Foreign Application Priority Data

Feb. 11, 2020    (TW) .................................. 109104192

(51) Int. Cl.
| | |
|---|---|
| *B29C 31/06* | (2006.01) |
| *B29C 45/14* | (2006.01) |
| *B29K 83/00* | (2006.01) |
| *B29C 31/00* | (2006.01) |
| *B29C 31/04* | (2006.01) |
| *B29C 35/02* | (2006.01) |
| *B29C 37/00* | (2006.01) |

(52) U.S. Cl.
CPC ...... *B29C 45/14336* (2013.01); *B29C 31/006* (2013.01); *B29C 31/04* (2013.01); *B29C 35/02* (2013.01); *B29C 37/0025* (2013.01); *B29K 2083/00* (2013.01)

(58) Field of Classification Search
None
See application file for complete search history.

(56) References Cited

U.S. PATENT DOCUMENTS

| | | | | |
|---|---|---|---|---|
| 5,116,557 A | * | 5/1992 | Debaes | ............... B29C 37/0032 264/46.7 |
| 2013/0175721 A1 | * | 7/2013 | Morgan | ............... B29C 37/0032 264/1.38 |

* cited by examiner

*Primary Examiner* — Jacob T Minskey
*Assistant Examiner* — Adrien J Bernard
(74) *Attorney, Agent, or Firm* — MUNCY, GEISSLER, OLDS & LOWE, P.C.

(57) ABSTRACT

A frame with an outer silicon layer and a manufacturing method of forming the silicone layer on the outer part of frame are disclosed. The manufacturing method includes a forming step, a combining step and a removing step. First, a pair of mold with a forming space is formed with a silicone carrier including an effective combination region and an ineffective region. An emplacing space is next formed in the effective combination region and a frame is put into the emplacing space. Before putting in the frame, either the outer part of frame or the emplacing space is coated with a silicone coating, and then the effective combination region is combined on the outer part of frame by a secondary sulfurization. Finally, the effective combination region is removed from the ineffective region to form a silicone layer, made of the effective combination region, on the outer part of frame.

10 Claims, 11 Drawing Sheets

FRAME WITH AN OUTER SILICONE LAYER AND A MANUFACTURING METHOD OF FORMING THE SILICONE LAYER ON THE OUTER PART OF FRAME

BACKGROUND OF THE INVENTION a) Field of the Invention

The present invention relates to a frame with an outer silicone layer and a manufacturing method of forming the silicone layer on the outer part of frame, and more particularly to a frame and a manufacturing method by which spill or burr being easily created when forming the silicone layer can be improved effectively, thereby increasing the production yield and reducing the manufacturing cost effectively.

b) Description of the Prior Art

Silicon injection molding has been already applied to all kinds of products considerably, such as waterproofed connectors, MCUs (Microcontroller Units), micro loudspeakers, etc., wherein silicone is used primarily for waterproofing, reducing vibration or providing elasticity.

In conventional silicon injection molding, a part of product to be enclosed by silicon is put into a pair of mold, and next silicon is injected into the mold, allowing silicone to directly enclose that part when silicone is cooled down. For example, when silicone injection molding is applied to a waterproofed connector, a frame is put into the mold, and silicone is directly formed on the frame by injection molding to achieve waterproofing by silicone. On the other hand, when silicon injection molding is applied to an MCU product, silicone is directly formed on the outer part of frame by injection molding, which provides a shock-proof effect by silicone.

However, as silicone is provided with excellent fluidity, when silicone is injected into the mold, silicone can flow easily into gaps at joint places of the mold, which will result in spill or burr on silicone after silicon is cooled down and formed, thereby causing a too large of tolerance in assembling to affect the waterproofing effect or decrease the precision. Therefore, after forming silicone, a large amount of manpower will be needed to trim the spill or burr, and this will increase the manufacturing cost considerably. Moreover, in order to increase the joint force of mold, injection cannot be performed using many cavities in the mold, which will affect the production efficiency.

Accordingly, how to provide a frame and a manufacturing method to improve effectively the phenomenon that the spill or burr can be created easily when forming the silicone layer is an issue to be solved by the present invention.

SUMMARY OF THE INVENTION

The primary object of the present invention is to provide a frame with an outer silicone layer and a manufacturing method of forming the silicone layer on the outer part of frame, and more particularly to a frame and a manufacturing method by which spill or burr being easily created when forming the silicone layer can be improved effectively, thereby increasing the production yield and reducing the manufacturing cost effectively.

To achieve the abovementioned object, the present invention first discloses a manufacturing method of forming the silicone layer on the outer part of frame. The manufacturing method includes a forming step, a combining step and a removing step. In the forming step, a pair of mold is provided first. An interior of the mold is provided with a forming space, and an interior of the forming step is formed with a silicone carrier. The silicone carrier is provided at least with an effective combination region and at least an ineffective region which is connected with the effective combination region; whereas, an interior of the effective combination region is provided with an emplacing space. In the combining step, a frame is provided first and the frame is put into the emplacing space. Before putting the frame into the emplacing space, either the frame or the emplacing space is coated with a silicone coating, an then the frame and the emplacing space are heated at a same time, allowing the silicone coating and the effective combination region to undergo a secondary sulfurization that the effective combination region can be combined on the outer part of frame. Finally, in the removing step, the silicone carrier and the frame that have undergone the secondary sulfurization are removed, and next the effective combination region is removed from the ineffective region, which in turn keeps the effective combination region on the outer part of frame, thereby forming a silicone layer on the outer part of frame.

In an embodiment, a first connecting section is formed between the effective combination region and the ineffective region. When the effective combination region is removed from the ineffective region, at least a first cut-off surface is formed between the first connecting section and the effective combination region.

In an embodiment, the thickness of first connecting section is smaller than that of silicon carrier.

In an embodiment, the first cut-off surface surrounds the surface of silicone layer.

In an embodiment, the effective combination region further includes a support region. The support region is disposed on a side of the emplacing space, and a second connecting section is formed between the support region and the effective combination region. When the support region is removed from the effective combination region, at least a second cut-off surface is formed between the second connecting section and the effective combination region.

In an embodiment, the thickness of second connecting section is smaller than that of silicone carrier.

In an embodiment, the second cut-off surface surrounds the surface of silicone layer.

To achieve the abovementioned object, the present invention also discloses a frame with an outer silicone layer, including a frame and a silicone layer. The silicone layer is disposed on the outer part of frame, and the silicone layer is provided at least with a cut-off surface.

In an embodiment, the cut-off surface surrounds the surface of silicone layer.

In an embodiment, the thickness of cut-off surface is smaller than that of silicone layer.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
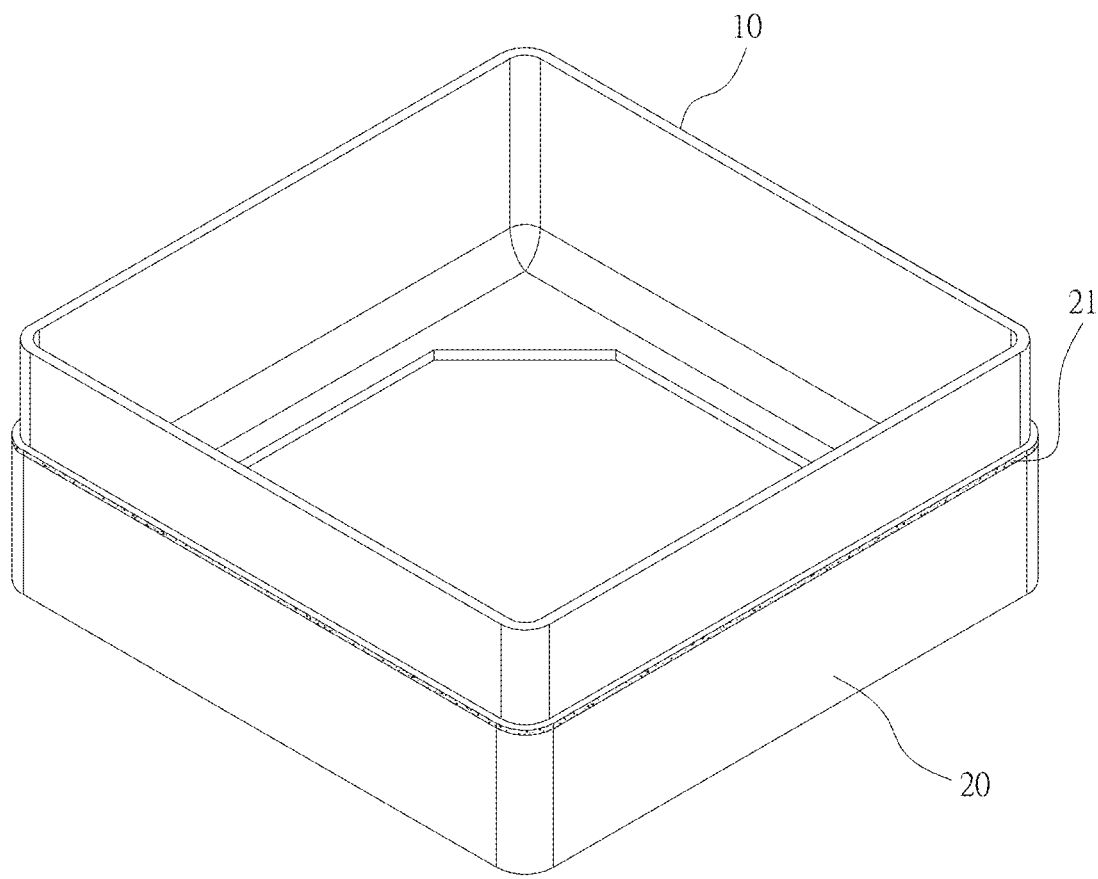
FIG. 1 shows a three-dimensional view of a frame with an outer silicone layer, according to the present invention.
Figure 2:
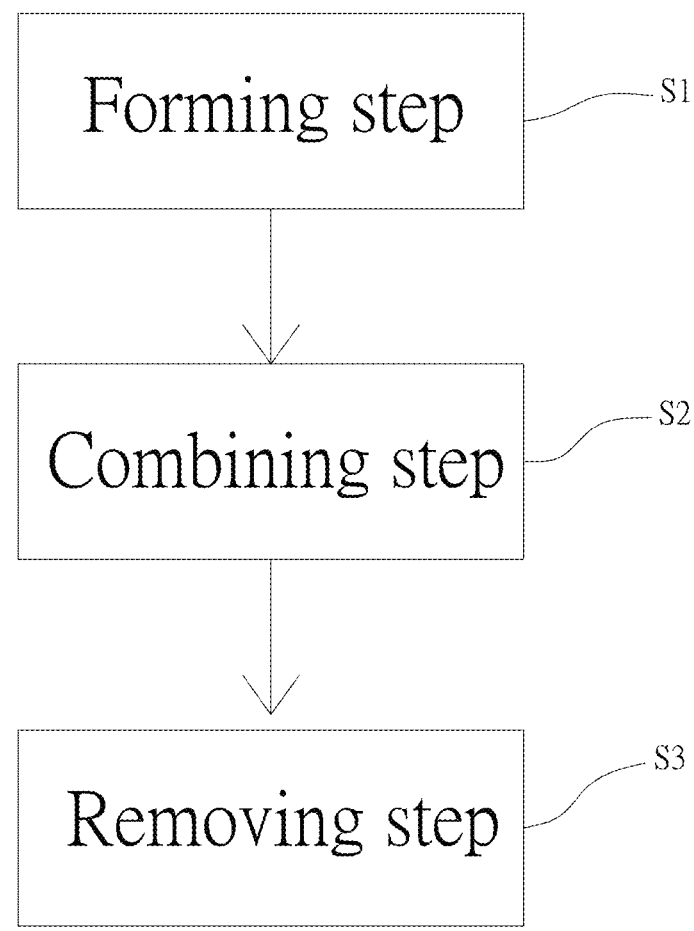
FIG. 2 shows a flow diagram of manufacturing process, according to the present invention.
Figure 3:
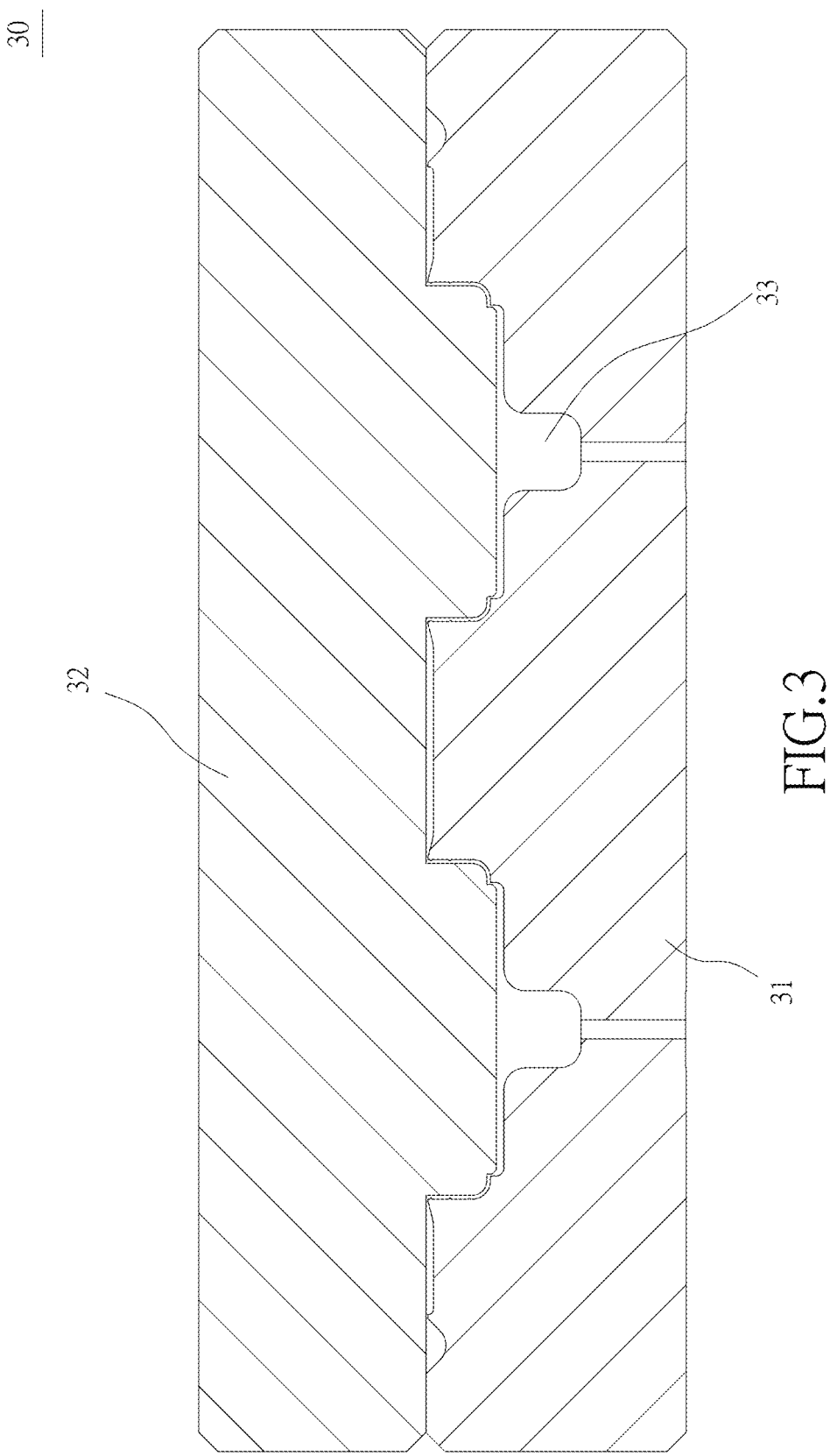
FIG. 3 shows a cutaway view of mold, according to the present invention.
Figure 4:
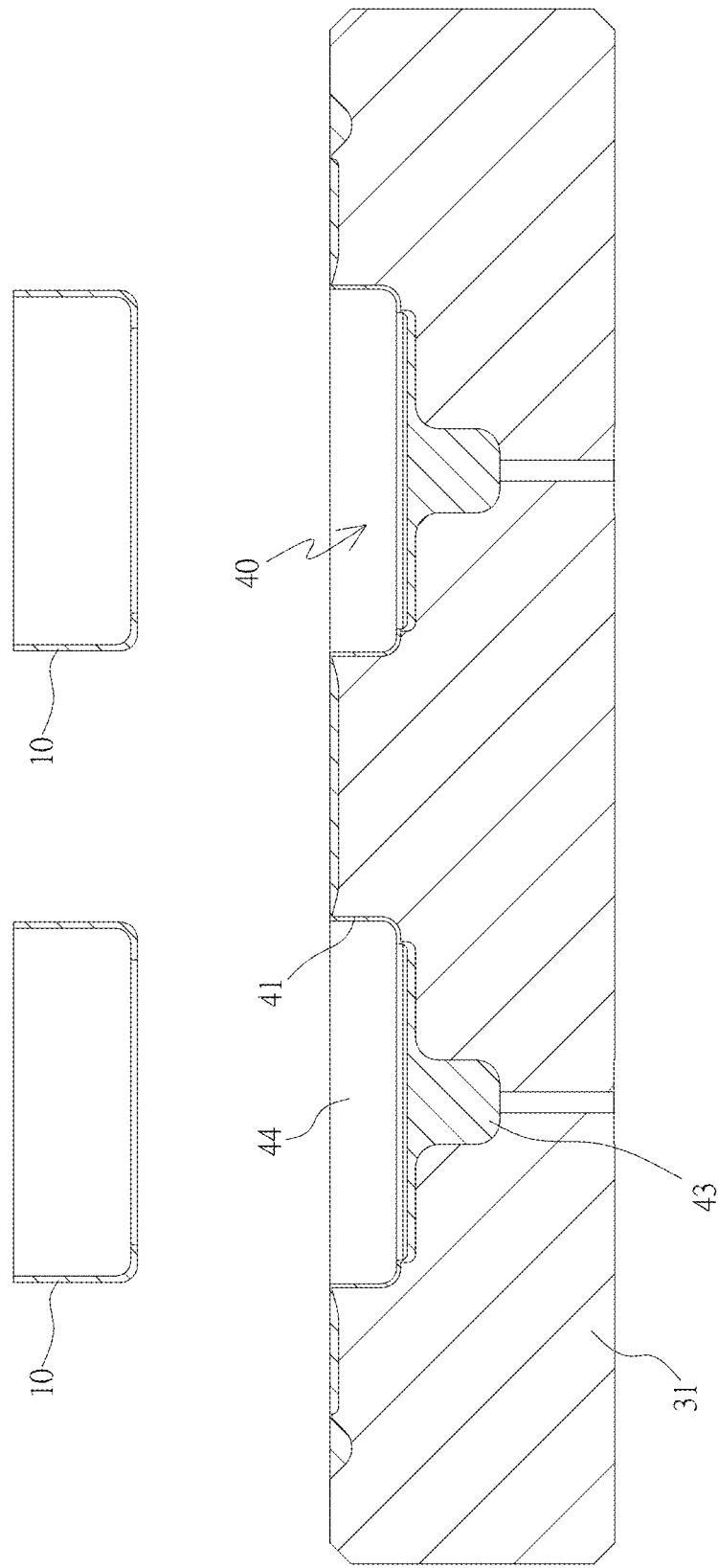
FIG. 4 shows a cutaway view that a silicone carrier is kept on a first mold base, according to the present invention.
Figure 5:
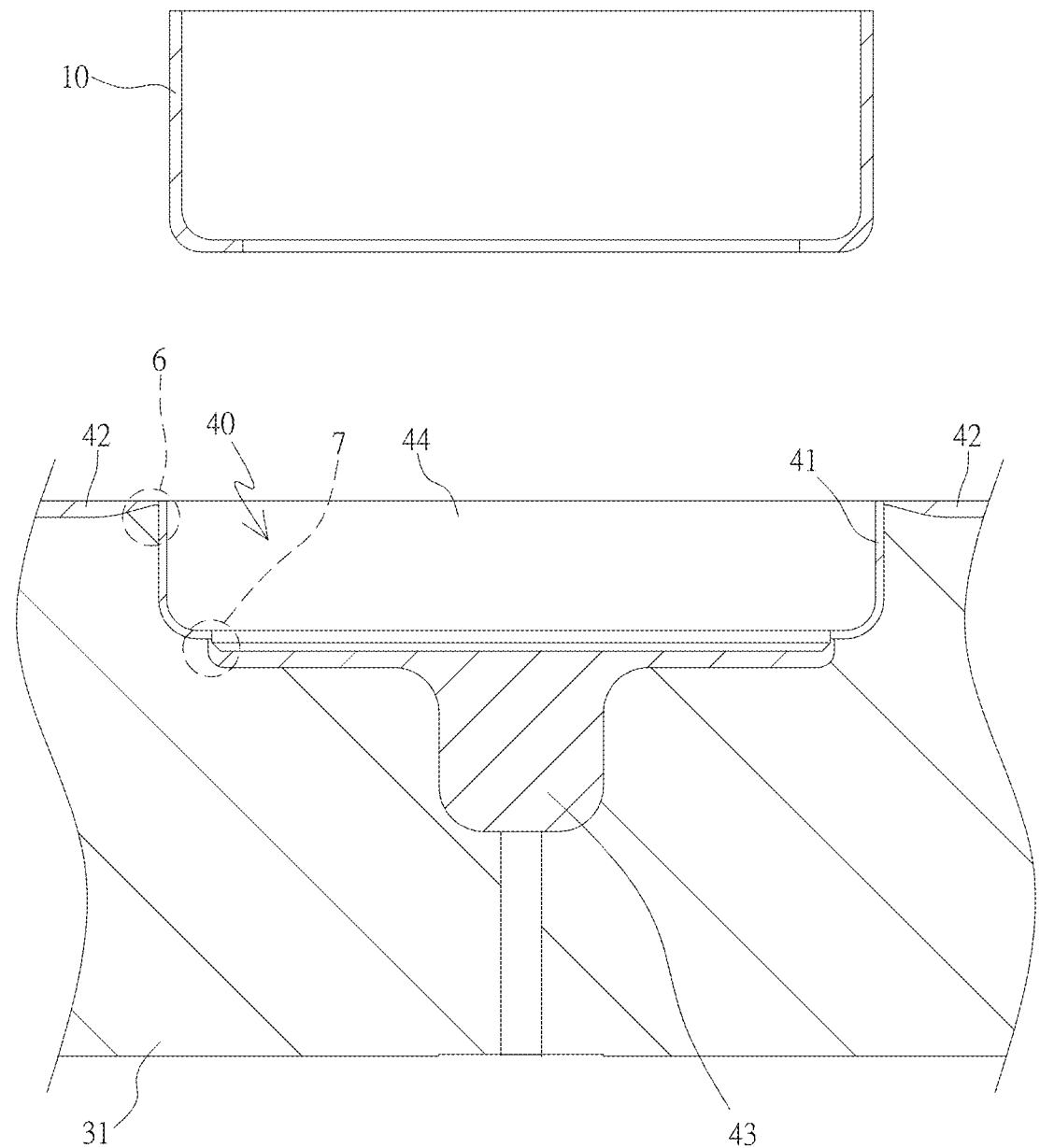
FIG. 5 shows an enlarged cutaway view before putting the frame into an emplacing space, according to the present invention.
Figure 6:
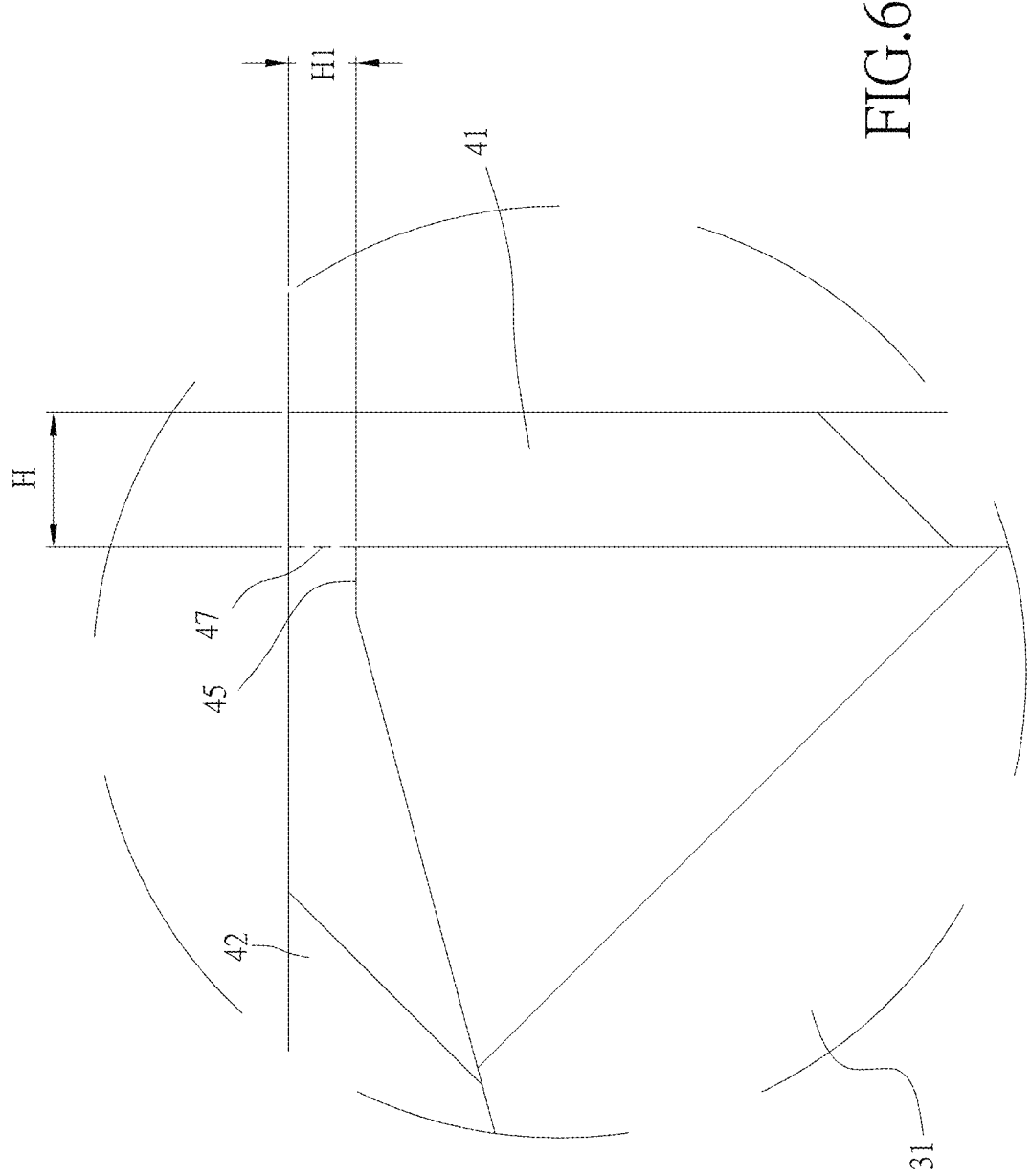
FIG. 6 shows an enlarged cutaway view of a first cut-off surface, according to the present invention.
Figure 7:
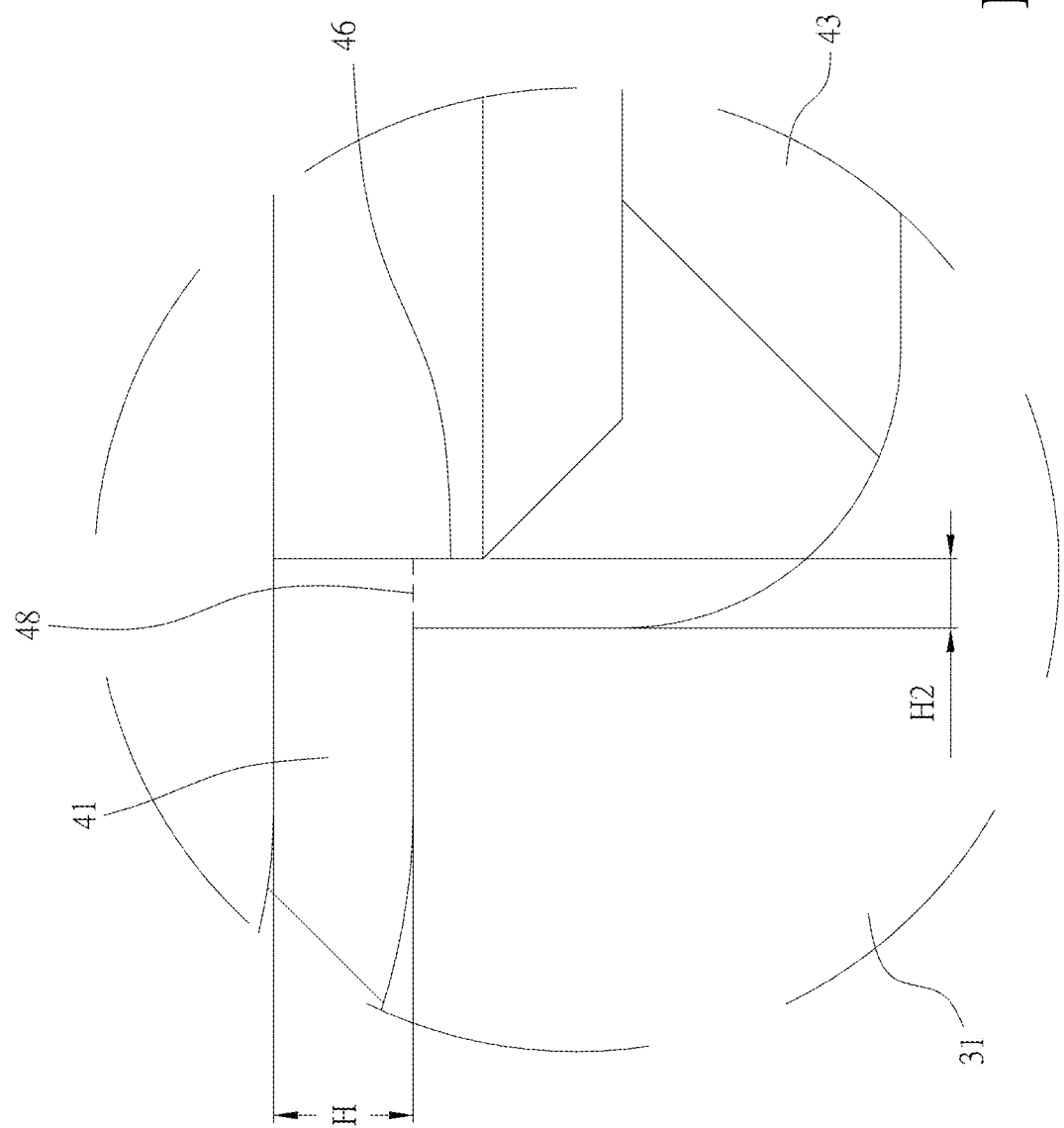
FIG. 7 shows an enlarged cutaway view of a second cut-off surface, according to the present invention.
Figure 8:
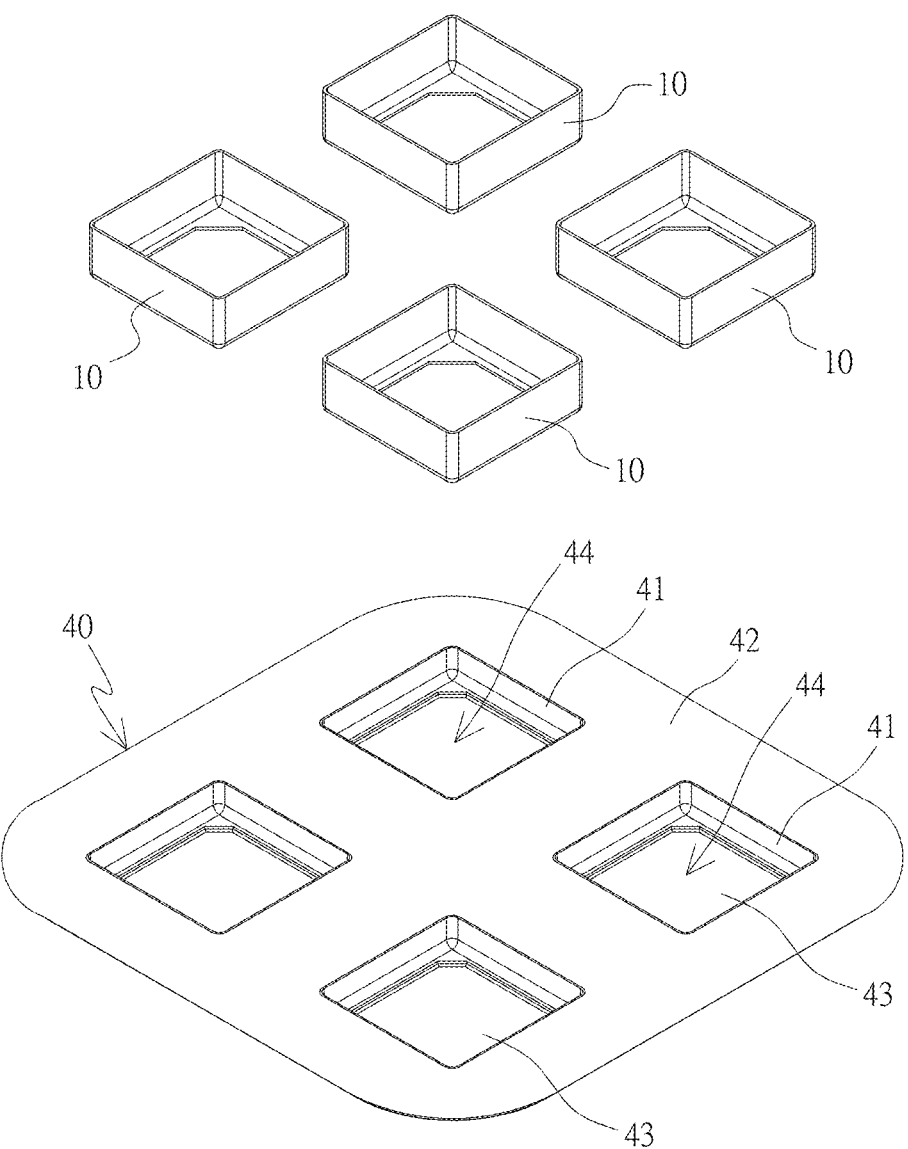
FIG. 8 shows an exploded view of the frame and the silicone carrier, according to the present invention.
Figure 9:
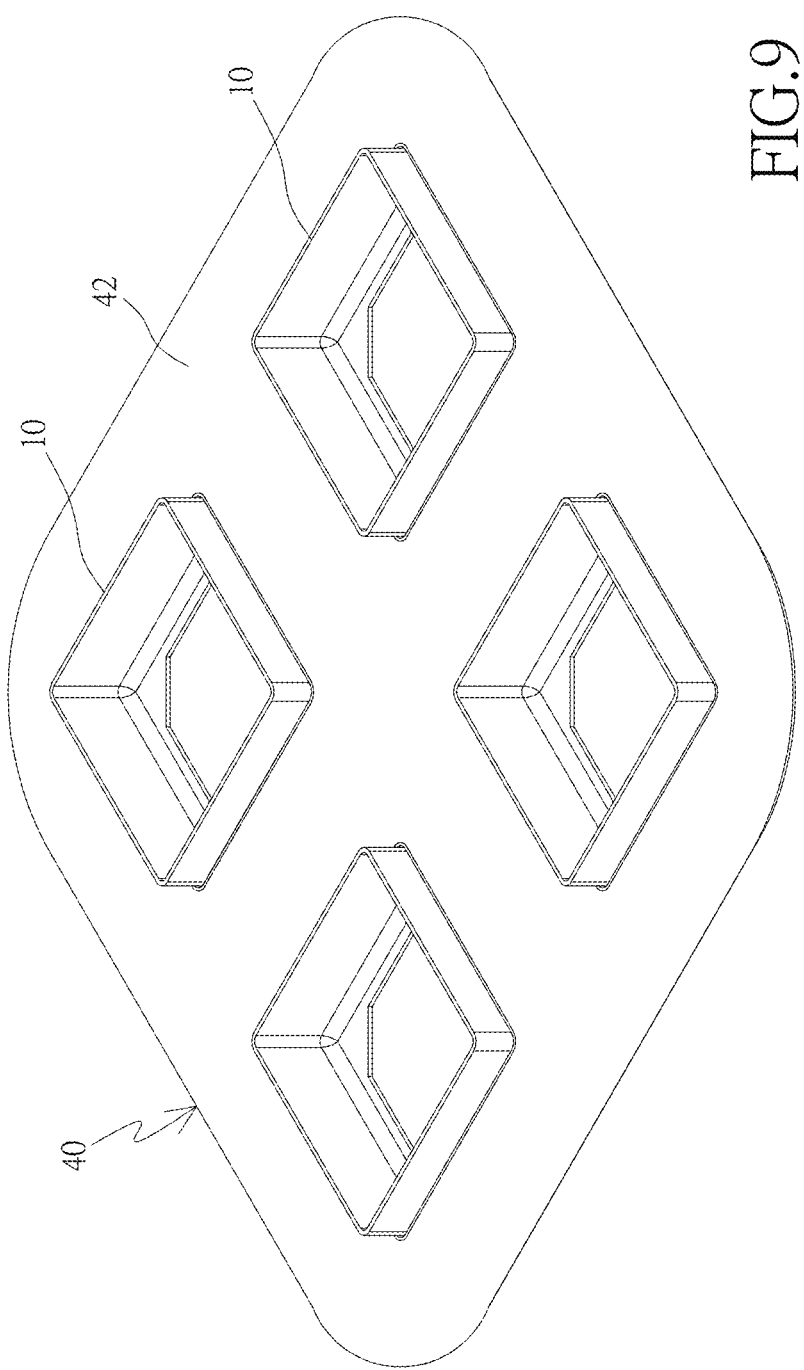
FIG. 9 shows a schematic view after combining the frame with the silicone carrier, according to the present invention.
Figure 10:
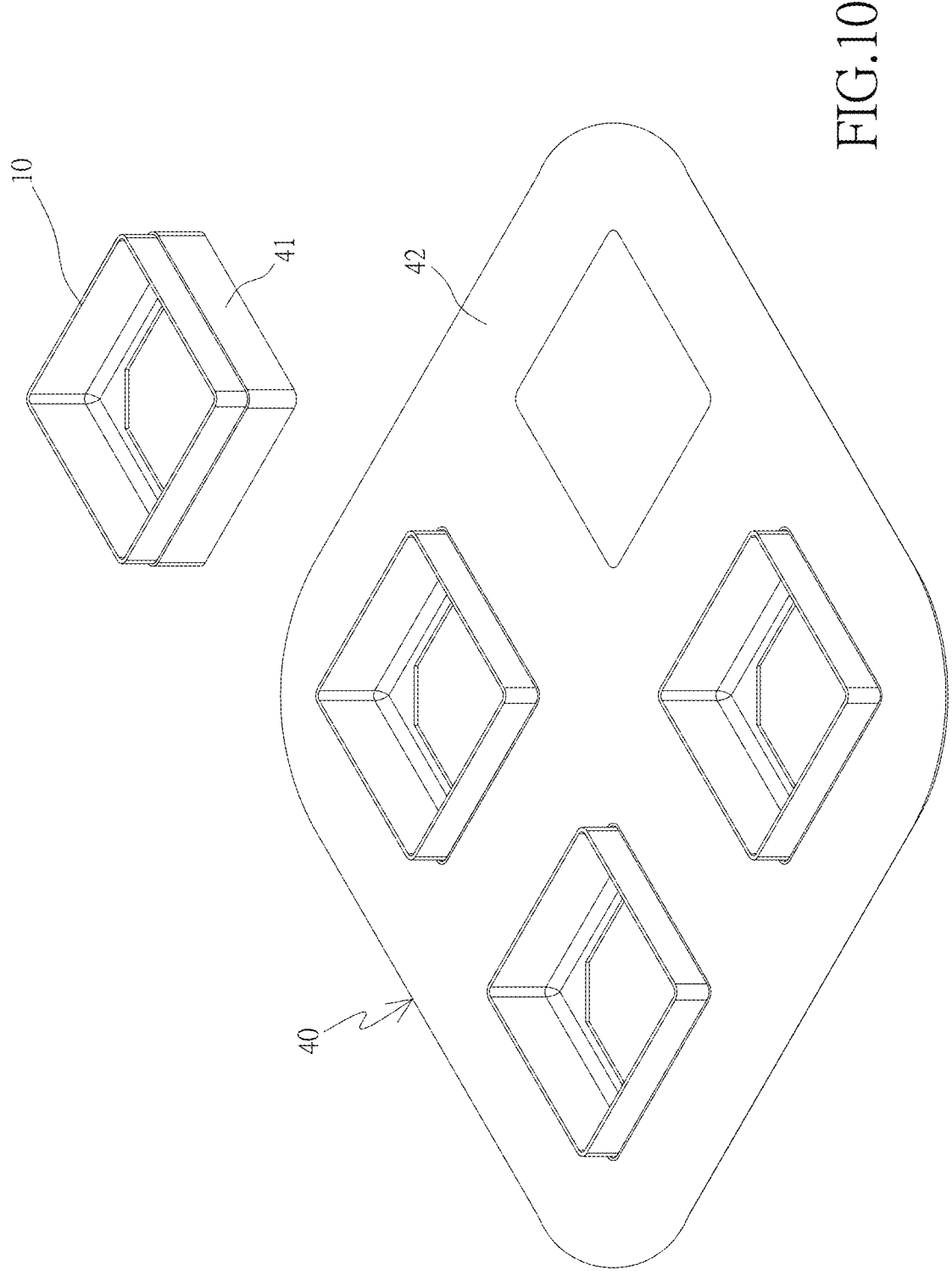
FIG. 10 shows a schematic view after separating an effective combination region from an ineffective region, according to the present invention.
Figure 11:
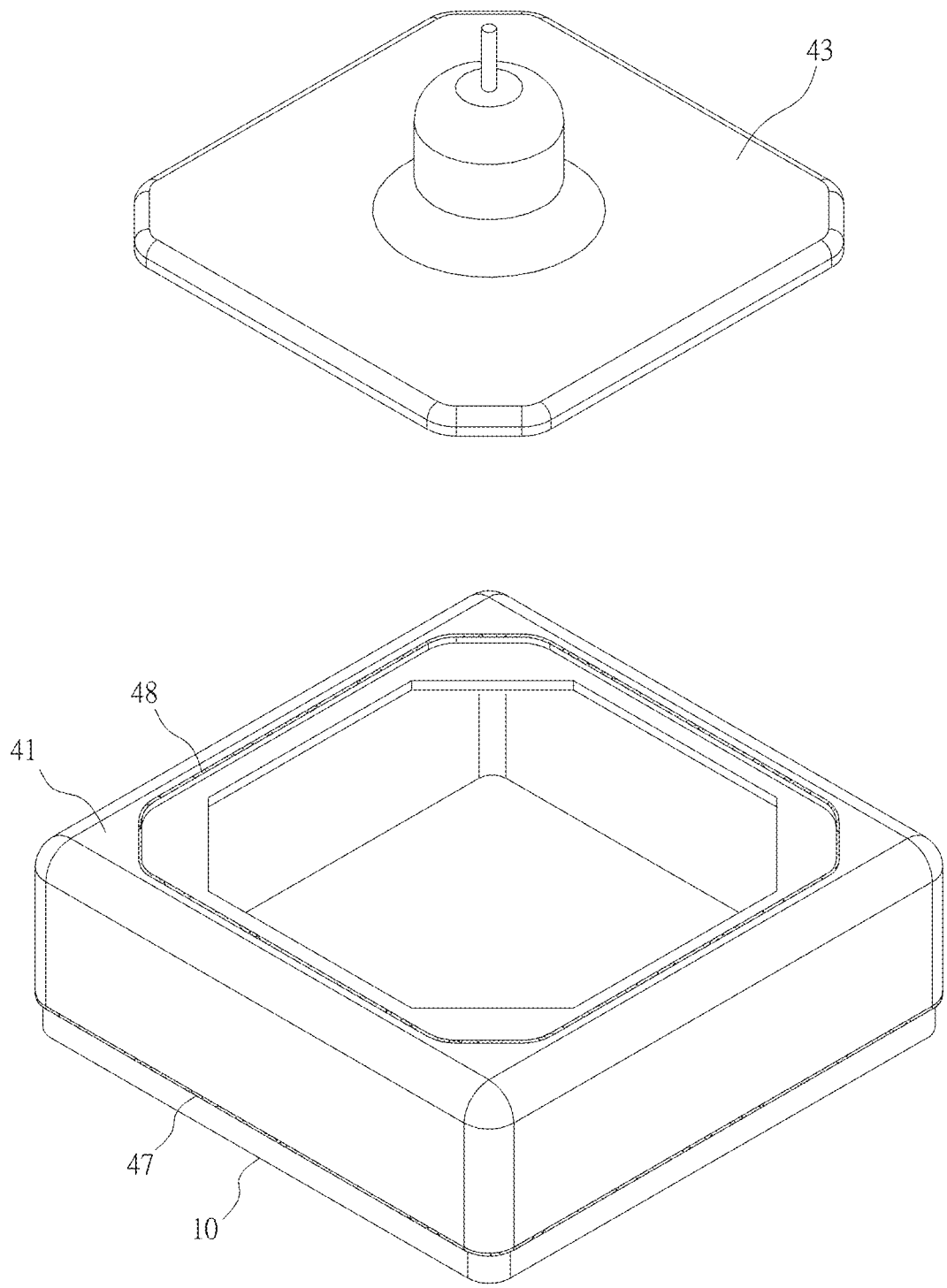
FIG. 11 shows a schematic view after separating a support region from the effective combination region, according to the present invention.

Referring to FIG. 1, the present invention discloses first a frame with an outer silicone layer, comprising a frame 10 and a silicone layer 20 which encloses the frame 10. In addition, a surface of the silicone layer 20 is formed at least with a cut-off surface 21.

Referring to FIGS. 2 to 11, the present invention also discloses a manufacturing method of forming the silicone layer on the outer part of frame. The manufacturing method comprises a forming step S1, a combining step S2 and a removing step S3.

In the forming step S1, a pair of mold 30 is provided first. The mold 30 is constituted by a first mold base 31 and a second mold base 32. A forming space 33 is formed between the first mold base 31 and the second mold base 32, and then liquid silicone is injected into the forming space 33, forming a silicone carrier 40 after silicone is cooled down and formed in the forming space 33. The silicone carrier 40 includes at least an effective combination region 41, an ineffective region 42 and at least a support region 43; whereas, an interior of the effective combination region 41 is provided with an emplacing space 44, and the support region 43 is disposed below the emplacing space 44. In addition, a first connecting section 45 is formed between the effective combination region 41 and the ineffective region 42; whereas, the thickness H1 of first connecting section 45 is smaller than the thickness H of effective combination region 41. A second connecting section 46 is formed between the effective combination region 41 and the support region 43, and the thickness H2 of second connecting section 46 is smaller than the thickness H of effective combination region 41. In the present embodiment, the silicone carrier 40 is provided with four effective combination regions 41, and the ineffective region 42 is connected among the effective combination regions 41. Furthermore, an interior of each effective combination region 41 is provided with the emplacing space 44, and a lower side of each emplacing space 44 is provided with the support region 43. After the silicone carrier 40 is cooled down and formed in the forming space 33, the second mold base 32 is removed, keeping the silicone carrier 40 on the first mold base 31. In the present embodiment, the silicone carrier 40 is kept on the first mold base 31 for the ease of description; whereas, in practical application, the silicone carrier 40 can be also removed from the first mold base 31.

In the combining step S2, at least a frame 10 is provided first. In the present embodiment, as the silicone carrier 40 is provided with four effective combination regions 41, four frames 10 are provided as well, and each frame 10 corresponds to one effective combination region 41. Next, a silicon coating is coated on the outer part of the frame 10 or inside the emplacing space 44 (as it belongs to a prior art, the silicon coating is not shown in the drawings). After that, each frame 10 is put into each emplacing space 44 orderly, followed by putting the first mold base 31, the silicone carrier 40 and these frames 10 into an oven (not shown in the drawings) at a same time, so as to perform a secondary sulfurization to the silicone coating and the silicone carrier 40, thereby enabling the effective combination regions 41 to be combined and adhered effectively on the outer parts of frames 10 through the secondary sulfurization.

In the removing step S3, the effective combination regions 41 are first removed from the ineffective region 42. During the removing process, as a first connecting section 45 is formed between each effective combination region 41 and the ineffective region 42, and the thickness H1 of first connecting section 45 is smaller than the thickness H of effective combination regions 41, the effective combination regions 41 can be removed from the ineffective region 42 by tearing off or cutting out. After the effective combination regions 41 are removed from the ineffective region 42, a first cut-off surface 47 is formed between the effective combination region 41 and the first connecting section 45. In the present embodiment, as the first connecting section 45 surrounds the surface of effective combination region 41, the first cut-off surface 47 will surround the surface of effective combination region 41. However, in practical application, the first connecting section 45 can be also connected between the effective combination region 41 and the ineffective region 42 segmentally, allowing the first cut-off surface 47 to be formed on the surface of effective combination region 41 segmentally. Next, each support region 43 is removed from each effective combination region 41; whereas, when each support region 43 is removed from each effective combination region 41, a second cut-off surface 48 is formed between the effective combination region 41 and the second connecting section 46. In the present embodiment, as the second connecting section 46 surrounds the surface of effective combination region 41, the second cut-off surface 48 will surround the surface of effective combination region 41. However, in practical application, the second connecting section 46 can be also connected between the effective combination region 41 and the support region 43 segmentally, allowing the second cut-off surface 48 to be formed on the surface of effective combination region 41 segmentally. Accordingly, the effective combination regions 41 can be kept on the outer parts of frames 10, thereby forming the silicone layer 20 on the outer parts of frames 10. In addition, the silicon layer 20 is formed at least with a cut-off surface 21 which is formed by the first cut-off surface 47 or the second cut-off surface 48.

It is worth mentioning that the silicon layer 20 formed on the frames 10 by using the manufacturing method provided by the present invention is able to improve the phenomenon of creating spill or burr easily by directly forming the silicon layer 20 on the frames 10 using a conventional injection molding method. In addition, the silicone carrier 40 can be also provided with plural effective combination regions 41, and at a same time, plural frames 10 can be put into plural effective combination regions 41 to achieve mass production, which improves the yield of products, and also reduces the manufacturing cost effectively, without using a large amount of manpower to trim the spill or burr.

Furthermore, the frame 10 of the present invention can be applied to all kinds of products, such as the frame of waterproofed connector or the frame of MCU. In addition, the frame 10 can be also made of metal or plastic, and the silicone layer 20 can be used as a waterproofed layer or buffer layer. Besides, the shape of silicone layer 20 can be designed according to various products that all kinds of product designs can be satisfied by just changing the shape of effective combination region 41 in the mold 30.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A manufacturing method of forming a silicone layer on an outer part of frame, comprising steps of:
   a) forming, wherein a pair of mold is provided first, an interior of the mold is provided with a forming space, an interior of the forming space is formed with a silicone carrier, the silicone carrier is provided with an effective combination region and an ineffective region connecting the effective combination region, and an interior of the effective combination region is provided with an emplacing space;
   b) combining, wherein a frame is provided and the frame is put into the emplacing space, with that before putting the frame into the emplacing space, either the frame or the emplacing space is coated with a silicone coating, and then the frame and the silicone carrier are heated at a same time, allowing the silicone coating and the effective combination region to undergo a secondary sulfurization that the effective combination region is combined on the outer part of frame; and
   c) removing, wherein the silicone carrier and the frame that have undergone the secondary sulfurization are removed, and then the effective combination region is removed from the ineffective region, which in turn keeps the effective combination region on the outer part of frame, thereby forming a silicone layer on the outer part of frame.

2. The manufacturing method of forming the silicone layer on the outer part of frame, according to claim 1, wherein a first connecting section is formed between the effective combination region and the ineffective region, and when the effective combination region is removed from the ineffective region, a first cut-off surface is formed between the first connecting section and the effective combination region.

3. The manufacturing method of forming the silicone layer on the outer part of frame, according to claim 2, wherein the thickness of first connecting section is smaller than that of silicon carrier.

4. The manufacturing method of forming the silicone layer on the outer part of frame, according to claim 2, wherein the first cut-off surface surrounds the surface of silicone layer.

5. The manufacturing method of forming the silicone layer on the outer part of frame, according to claim 2, wherein the effective combination region further includes a support region, the support region is disposed on a side of the emplacing space, and a second connecting section is formed between the support region and the effective combination region, with that when the support region is removed from the effective combination region, a second cut-off surface is formed between the second connecting section and the effective combination region.

6. The manufacturing method of forming the silicone layer on the outer part of frame, according to claim 5, wherein the thickness of second connecting section is smaller than that of silicone carrier.

7. The manufacturing method of forming the silicone layer on the outer part of frame, according to claim 5, wherein the second cut-off surface surrounds the surface of silicone layer.

8. A frame with an outer silicone layer, comprising
   a frame; and
   a silicone layer,
   wherein the silicone layer is disposed on the outer part of frame and is provided with a cut-off surface, and
   wherein during formation, the frame and the silicone carrier are heated at a same time, allowing the silicone coating and the effective combination region to undergo a secondary sulfurization that the effective combination region is combined on the outer part of frame.

9. The frame with the outer silicone layer, according to claim 8, wherein the cut-off surface surrounds the surface of silicone layer.

10. The frame with the outer silicone layer, according to claim 8, wherein the thickness of cut-off surface is smaller than that of silicone layer.

\* \* \* \* \*